US007372506B2

(12) United States Patent
Cho

(10) Patent No.: US 7,372,506 B2
(45) Date of Patent: May 13, 2008

(54) METHOD AND APPARATUS TO DISPLAY ON-SCREEN DISPLAY USER-GUIDE INFORMATION ABOUT STATUS OF EXTERNAL DEVICE

(75) Inventor: Jung-hoon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 491 days.

(21) Appl. No.: 10/892,247

(22) Filed: Jul. 16, 2004

(65) Prior Publication Data

US 2005/0018084 A1    Jan. 27, 2005

(30) Foreign Application Priority Data

Jul. 21, 2003    (KR)    .................... 10-2003-0049839

(51) Int. Cl.
*H04N 5/50* (2006.01)
(52) U.S. Cl. .................. 348/569; 348/705; 348/706
(58) Field of Classification Search ................ 348/705, 348/706, 569, 553, 552, 180; 710/15–19; 725/37, 38, 133, 141, 153
See application file for complete search history.

(56) References Cited

U.S. PATENT DOCUMENTS

| 5,486,877 | A | * | 1/1996 | Tanaka ........................ 348/722 |
| 5,565,929 | A | * | 10/1996 | Tanaka ........................ 348/565 |
| 5,631,850 | A | * | 5/1997 | Tanaka et al. ............... 702/122 |
| 5,739,763 | A | * | 4/1998 | Ouchi et al. ........... 340/825.22 |
| 5,760,698 | A | * | 6/1998 | Iijima et al. ................ 340/3.43 |
| 6,040,874 | A | * | 3/2000 | Kim ............................. 348/569 |
| 6,069,619 | A | | 5/2000 | Kim |
| 6,100,936 | A | * | 8/2000 | Jordan et al. ................ 348/552 |
| 6,437,828 | B1 | * | 8/2002 | Chambers et al. .......... 348/458 |
| 6,490,009 | B1 | * | 12/2002 | Asakura ..................... 348/705 |
| 6,646,685 | B1 | * | 11/2003 | Kim ............................ 348/569 |
| 6,867,820 | B2 | * | 3/2005 | Jin ............................. 348/738 |
| 6,912,613 | B2 | * | 6/2005 | Lee et al. ................... 710/316 |
| 2002/0095534 | A1 | * | 7/2002 | Bae ............................. 710/16 |

FOREIGN PATENT DOCUMENTS

| JP | 10-304260 | 11/1998 |
| KR | 97-25012 | 5/1997 |
| KR | 1997-20120 | 5/1997 |
| KR | 1998-47372 | 9/1998 |
| KR | 1999-27735 | 7/1999 |
| KR | 2001-39340 | 5/2001 |

OTHER PUBLICATIONS

Chinese Office Action dated May 19, 2006 issued in CN Appln 2004100690997.
Korean Official Action issued on Jul. 27, 2005, for Korean Patent Application No. 2003-49839.

* cited by examiner

*Primary Examiner*—Victor R. Kostak
(74) *Attorney, Agent, or Firm*—Stanzione & Kim, LLP

(57) ABSTRACT

A method and apparatus to display user-guide on-screen display information about a status of an external device on a display device connected with the external device may include attempting to detect a signal from the external device when the display device is in an external input mode, displaying OSD information indicating that a signal is being detected from the external device, for a predetermined time, if no signal is detected in the signal detection operation, and preventing the OSD information displaying operation if a signal is detected in the signal detection operation.

20 Claims, 3 Drawing Sheets

METHOD AND APPARATUS TO DISPLAY ON-SCREEN DISPLAY USER-GUIDE INFORMATION ABOUT STATUS OF EXTERNAL DEVICE

CROSS-REFERENCE TO RELATED APPLICATIONS

This application claims the priority of Korean Patent Application No. 2003-49839, filed on Jul. 21, 2003, in the Korean Intellectual Property Office, the disclosure of which is incorporated herein in its entirety by reference.

BACKGROUND OF THE INVENTION

1. Field of the Invention

The present general inventive concept relates to a display device, and more particularly, to a method and apparatus to display on-screen display user-guide information on the status of an external device until the external device operates normally.

2. Description of the Related Art

Typically, a display device demodulates broadcast signals transmitted from a broadcasting station and outputs the demodulated broadcast signals in the form of video and/or audio signals to a cathode-ray tube and/or a speaker. In addition, the display device receives signals from an external device, such as a set-top box, DVD player, VCR, or LD player, etc., and outputs the signals to the cathode-ray tube and/or the speaker.

A user may turn off power from the display device while watching the video signals (or listening to the audio signals) received from the external device and displayed on the display device. The user may then turn on power to the display device, and then turn on power to the external device. In this case, the display device may start up and become ready to operate normally in a relatively short time, while the external device may be take longer to start up and output video/audio signals after a predetermined time. Therefore, the display device cannot receive signals from the external device for the predetermined time, and so displays user-guide information, such as "no signal input", on its screen for the predetermined time. This may lead the user to incorrectly think that the external device or the display device is malfunctioning, and consequently, lead the user to begin pressing buttons and looking for a problem.

SUMMARY OF THE INVENTION

In order to solve the above and/or other problems, it is an aspect of the present general inventive concept to provide a method of displaying user-guide on-screen display (OSD) information on the display device for a predetermined time to prevent a user from incorrectly being instructed that an external device or a display device is malfunctioning, the OSD information indicating that a signal of the external device is being detected.

It is another aspect of the present general inventive concept to provide an apparatus to display user-guide OSD information indicating that a signal of an external device is being detected on a display device for a predetermined time.

Additional aspects and advantages of the present general inventive concept will be set forth in part in the description which follows and, in part, will be obvious from the description, or may be learned by practice of the general inventive concept.

The above and/or other aspects of the present general inventive concept are achieved by providing a method of displaying user-guide on-screen display (OSD) information about a status of an external device on a display device connected with the external device, the method including attempting to detect a signal from the external device when the display device is in an external input mode, displaying OSD information indicating that a signal is being detected from the external device, for a predetermined time, if no signal is detected in the signal detection operation, and preventing the OSD information displaying operation if a signal is detected in the signal detection operation.

According to an aspect of the present general inventive concept, the method may further include displaying a reproduction signal of the external device if a signal is detected in the signal detecting operation, and displaying OSD information advising that a status of connection of the external device to a power source and to the display device should be checked if no signal is detected for the predetermined time in the signal detection operation.

The above and/or other aspects of the present general inventive concept may also be achieved by providing a method of displaying user-guide on-screen display (OSD) information on a status of an external device on a display device connected with the external device, the method including attempting to detect a synchronous signal generated by the external device, displaying for a predetermined time first OSD information indicating that the display device is waiting for a signal of the external device if the synchronous signal is not detected yet, and displaying second OSD information advising that a status of connection of the external device to power and/or to the display device should be checked.

According to an aspect of the present general inventive concept, the synchronous signal can be detected after checking whether an initial screen of the display device is in an external input mode.

The above and/or other aspects of the present general inventive concept may also be achieved by providing a display device to display user-guide on-screen display (OSD) information on a status of an external device, the display device including an external device connection unit that is connected to at least one external device, a sync detection unit that detects a synchronous signal among signals that are output from the at least one external device to the external device connection unit, and a control unit that controls generation of OSD data according to the detection result of the sync detection unit.

According to an aspect of the present general inventive concept, the control unit outputs OSD data indicating that a signal is being detected from the at least one external device if the synchronous signal is not detected, and prevents the OSD data from being output if the synchronous signal is detected.

According to another aspect of the present general inventive concept, the display device may further include an OSD generating unit that converts the OSD data into OSD information in the form of graphics.

The above and/or other aspects of the present general inventive concept may also be achieved by providing a recording medium storing computer-readable codes to perform a method of displaying user-guide on-screen display (OSD) information on a display device connected with the external device, the method including detecting a signal from the external device when the display device is in an external input mode, and displaying OSD information for a predetermined time to indicate a detection status of the external device if the signal is not detected from the external device in the signal detecting operation, and preventing the OSD information from being displayed if the signal is detected in the signal detection operation.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE INVENTION

Figure 1:
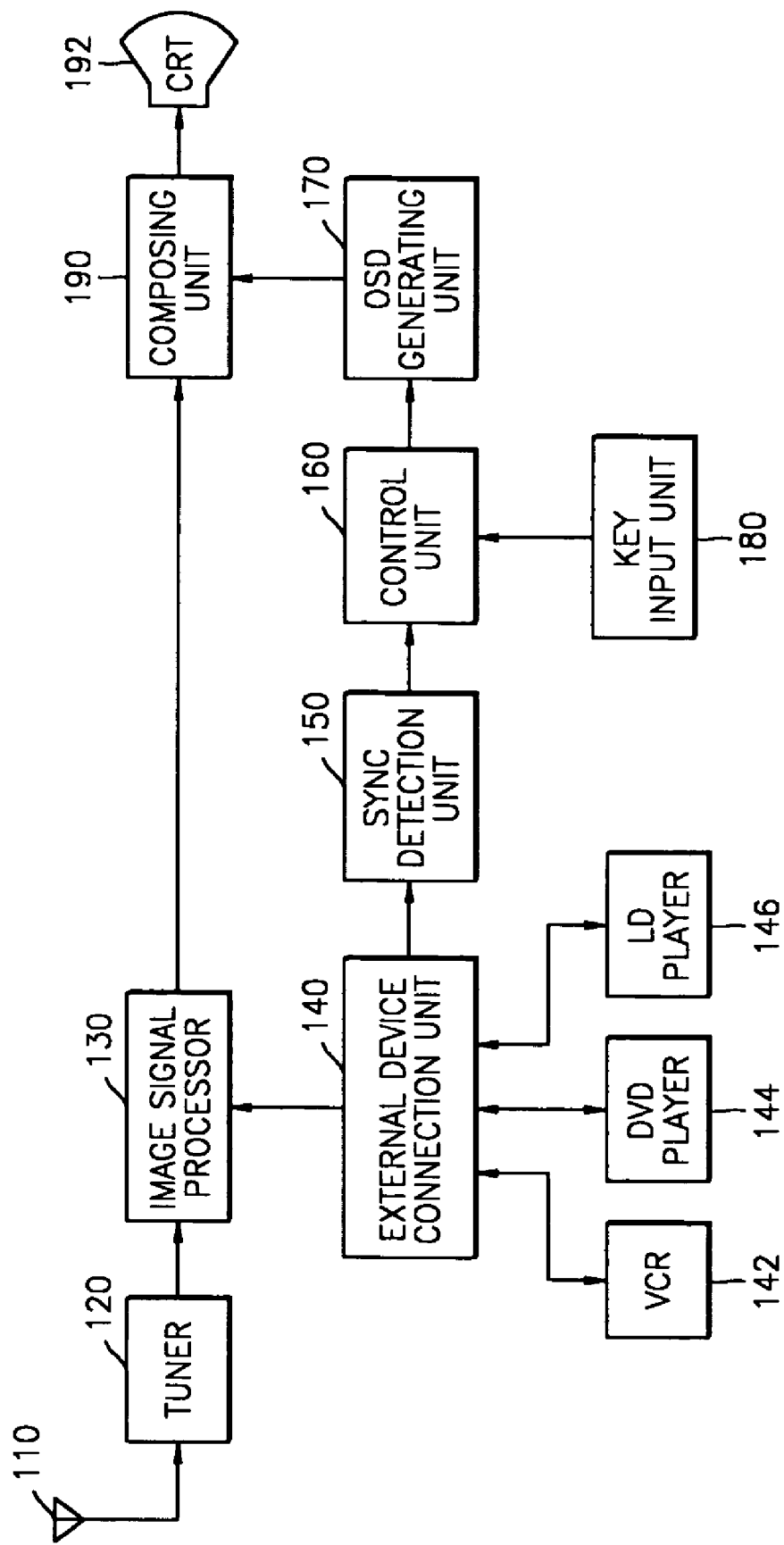
FIG. 1 is a block diagram of an apparatus to display user-guide on-screen display information according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an apparatus to display user-guide on-screen display (OSD) information according to an embodiment of the present general inventive concept. The apparatus may include an antenna 110, a tuner 120, an image signal processor 130, an external device connection unit 140, a sync detection unit 150, a control unit 160, an on-screen display (OSD) generating unit 170, a key input unit 180, a composing unit 190, and a cathode-ray tube (CRT). In this embodiment, the CRT 190 is included in the apparatus as a display. However, the general inventive concept is not limited thereto. For example, any display, such as a plasma display panel, a liquid crystal device, a flat panel display, etc., can be used as the display.

The tuner 120 can tune in a broadcast signal received by the antenna 110.

The image signal processor 130 can extract red, green, and blue (RGB) signals from the broadcast signal and/or signals received from an external device, such as a VCR 142, a DVD player 144, or an LD player 146, and can process the RGB signals (video signals) to be displayed on the CRT 192.

The external device connection unit 140 can be connected to a plurality of external devices, such as the VCR 142, the DVD player 144, and the LD player 146, and can receive reproduction signals from the external devices.

The sync detection unit 150 detects a synchronous signal from the reproduction signals received by the external device connection unit 140. In this embodiment, the synchronous signal can be detected by the sync detection unit 150. However, the general inventive concept is not limited thereto. Any specific signal of a digital signal stream transmitted from an external device can be used as the synchronous signal, and a detection unit can be used as the sync detection unit 150 to detect the specific signal of the digital signal stream. In addition, the specific signal of the digital signal stream may be a signal representing a synchronous signal or an identification signal of the digital signal stream.

The control unit 160 can check whether the synchronous signal is detected by the sync detection unit 150, upon receipt of an external input mode command. If the synchronous signal is detected, the control unit 160 controls the OSD generating unit 170 not to output any OSD information. In this case, only the video signals processed by the image signal processor 130 are displayed on CRT 192. If the synchronous signal is not detected, the control unit 160 can output OSD data regarding a detection status of the external device. Alternatively, when the synchronous signal is not detected, the control unit 160 can generate first OSD data indicating it is waiting for a signal input from an external device, and then can generate second OSD data indicating whether the synchronous signal is detected.

The OSD generating unit 170 can convert the first and second OSD data generated by the control unit 160 into OSD information in the form of graphics or text.

The composing unit 190 can compose the video signals processed by the image signal processor 130 and the OSD information generated by the OSD generating unit 170.

The CRT unit 190 can display the resulting video signals and/or OSD information output from the composing unit 190.

The key input unit 180 can allow a user to enter an external input mode command and various other kinds of commands, and can output the entered command(s) to the control unit 160.

Figure 2:
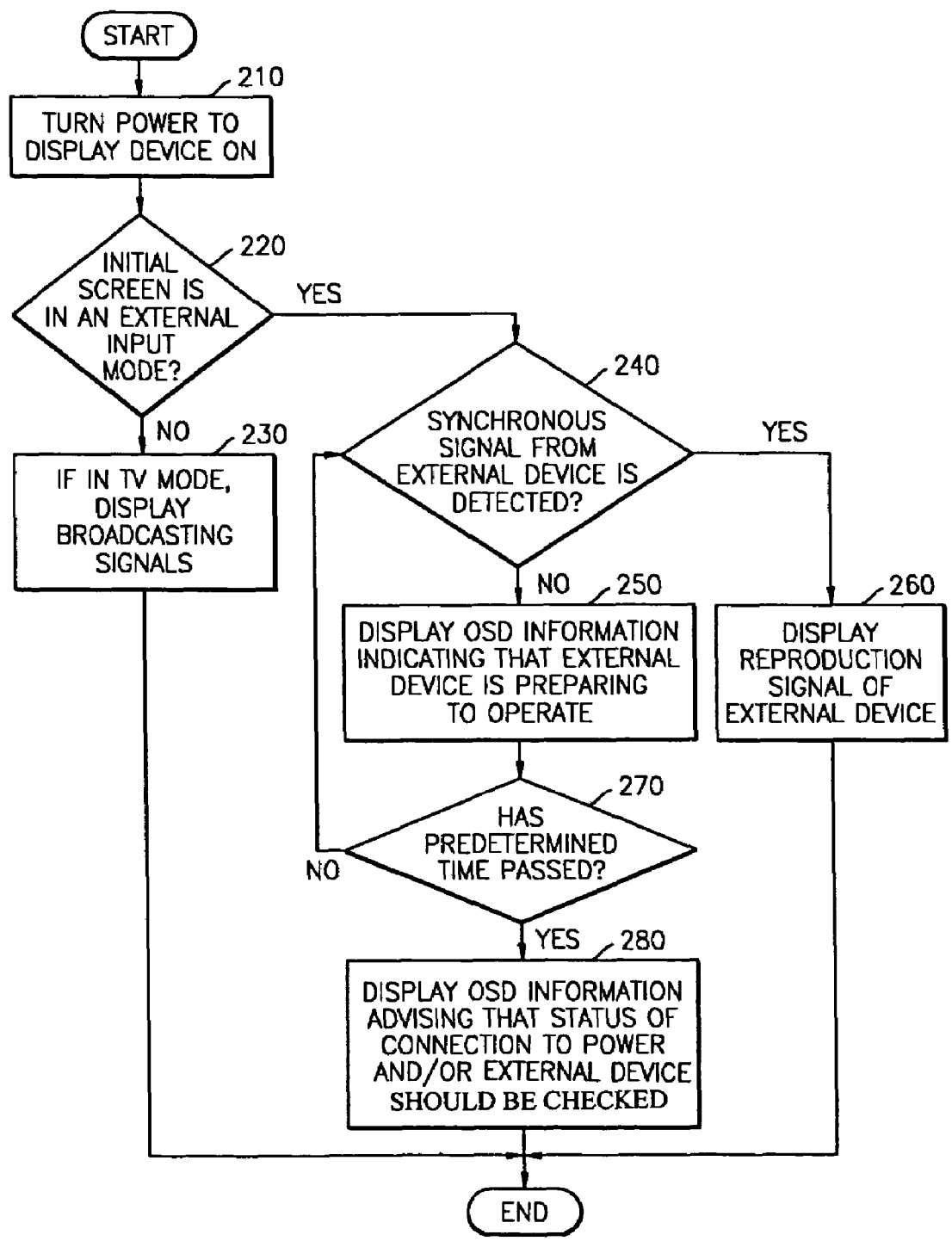
FIG. 2 is a flowchart of a method of displaying user-guide on-screen display information according to another embodiment of the present general inventive concept.

FIG. 2 is a flowchart of a method of displaying user-guide OSD information according to another embodiment of the present general inventive concept.

Referring to FIG. 2, power to a display device is turned on in operation 210.

It can be checked if an initial screen of the display device is set for an external input mode to receive at least one signal from an external device in operation 220.

If the initial screen of the display device is not set for the external input mode in operation 220, it can be determined that it is a television mode, and broadcast signals received from an antenna are displayed on a screen in operation 230.

If the initial screen of the display device is set for the external input mode in operation 220, it can be checked whether reproduction signals are input to the display device from an external device connected thereto in operation 240.

If no synchronous signal is detected in operation 240, OSD information indicating that reproduction signals from the external device are being detected can be displayed in operation 250.

It can be checked whether a predetermined time has passed in operation 270, and if not, operations 240 through 270 are repeated.

If the synchronous signal is detected in operation 240, the reproduction signals generated by the external device can be normally displayed on the screen in operation 260.

If the synchronous signal is not detected for the predetermined time, other OSD information advising that the status of connection to power and/or connection to the external device should be checked can be displayed on the screen in operation 280.

In other words, when no synchronous signal is detected from the external device, the display device can display OSD information, such as "signal is being detected," on its screen until the predetermined time elapses, and then can display other OSD information, such as "no signal" or "please check whether the external device is plugged in and connected to display device," on the screen once the predetermined time elapses without detection of the synchronous signal.

For a reference, examples of cases in which no input signal is received from the external device can be when: 1) the display device is switched to the external input mode while the external device is turned off; 2) the external device is switched off while the display device is in the external input mode; 3) a channel or an output mode of the external device is changed, for example, from 480i into 720P while the display device is in the external input mode; and 4) the display device is switched to the external input mode while the external device is in the process of being turned on.

Figure 3:
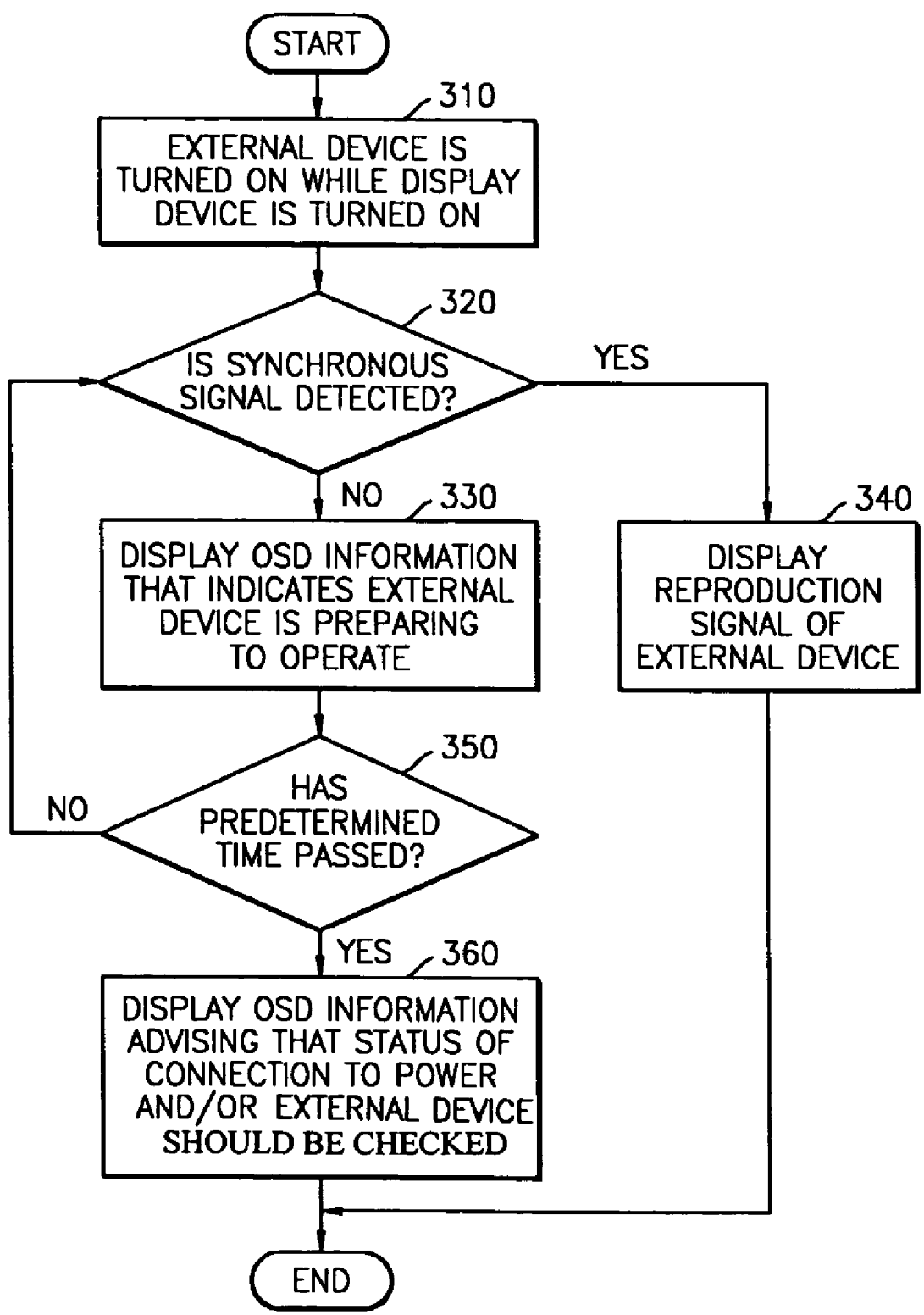
FIG. 3 is a flowchart of a method of displaying user-guide on-screen display information according to another embodiment of the present general inventive concept.

FIG. 3 is a flowchart of a method of displaying user-guide OSD information according to another embodiment of the present general inventive concept.

First, an external device can be turned on while a display device is turned on in operation 310.

It can be determined whether a synchronous signal from the external device is input in operation 320.

If the synchronous signal is not detected from the external device, OSD information indicating that the external device is preparing to operate can be displayed in operation 330.

It can be checked if a predetermined time has passed in operation 350.

If the synchronous signal is detected from the external device in operation 320, reproduction signals input from the external device can be normally displayed in operation 340.

If the synchronous signal is not detected from the external device for the predetermined time, OSD information advising that the status of connection to power and/or connection to the external device should be checked can be displayed in operation 350. In other words, the display device can display OSD information, such as "signals are being detected," on its screen for the predetermined time, and can display OSD information, such as "no signal" or "please check whether the external device is plugged in and connected to the display device," on its screen once the predetermined time has elapsed without detection of the synchronous signal.

It is possible that the method and apparatus described above according to the present general inventive concept can be implemented as computer-readable codes recorded on a recording medium accessible by a computer. The recording medium can include a recording device, such as ROM, RAM, a CD-ROM, a magnetic tape, a hard disc, a floppy disc, a flash memory, an optical data storage device, etc., in which computer-readable data can be stored. The recording medium can also include any type of wire or wireless transmission unit. In addition, the computer-readable codes can be distributed, exchanged, downloaded, uploaded among recording media of a plurality of computer systems connected to a network, and executed in that distributed form, using a distribution method.

According to the embodiments of the present general inventive concept, when no signal is detected from the external device for a predetermined time, displaying OSD information regarding the operational status of an external device can prevent a user from mistakenly thinking that the display device or the external device is malfunctioning.

Although a few embodiments of the present general inventive concept have been shown and described, it will be appreciated by those skilled in the art that changes may be made in these embodiments without departing from the principles and spirit of the invention, the scope of which is defined in the appended claims and their equivalents.

What is claimed is:

1. A method of displaying user-guide on-screen display (OSD) information on a display device connected with the external device, the method comprising:
    detecting a signal from the external device when the display device is in an external input mode;
    displaying OSD information about a status of the external device for a predetermined time to indicate the signal is being detected from the external device, if no signal is detected in the signal detection operation, and preventing the OSD information displaying operation if the signal is detected in the signal detection operation;
    displaying a reproduction signal of the external device if the signal is detected in the signal detection operation; and
    displaying OSD information indicating that a status of connection of the external device to a power source and to the display device needs to be checked if the signal is not detected for the predetermined time in the signal detection operation.

2. A method of displaying user-guide on-screen display (OSD) information on a status of an external device on a display device connected with the external device, the method comprising:
    detecting a synchronous signal generated by the external device;
    displaying for a predetermined time first OSD information indicating that the display device is waiting for a signal of the external device if the synchronous signal is not detected; and
    displaying second OSD information advising that a status of connection of the external device to a power source and to the display device needs to be checked if the signal of the external device is not detected for another predetermined time.

3. The method of claim 2, wherein the synchronous signal is detected after checking whether an initial screen of the display device is in an external input mode.

4. A display device to display user-guide on-screen display (OSD) information, the display device comprising:
    an external device connection unit that is connected to at least one external device;
    a sync detection unit that detects a synchronous signal among signals that are output from the at least one external device to the external device connection unit; and
    a control unit that controls generation of OSD data corresponding to one of a synchronous signal from the external device being in a process of being detected, a synchronous signal detected from the external device, and a need to check an operating status of the external device if the signal of the external device is not detected for a predetermined time.

5. The apparatus of claim 4, wherein the control unit outputs the OSD data indicating that a signal is being detected from the at least one external device if the synchronous signal is not detected, and prevents the OSD data outputting operation if the synchronous signal is detected.

6. The apparatus of claim 4, further comprising:
    an OSD generating unit that converts the OSD data into OSD information in the form of graphics.

7. A display device to display user-guide on-screen display (OSD) information, the display device comprising:
    a signal detecting unit that detects a predetermined signal from the external device when the display device is in an external input mode; and a control unit to generate OSD information for a predetermined time to indicate a detection status of the external device if the predetermined signal is not detected in the signal detecting units, wherein the control unit displays the OSD information to indicate that a status of connection of the external device to a power source or the display device needs to be checked, if the predetermined signal is not detected within another predetermined time in the signal detecting unit.

8. The display device of claim 7, wherein the OSD information to indicate the detection status of the external device comprises an indication that a signal is being detected from the external device.

9. The display device of claim 7, wherein the OSD information to indicate the detection status of the external device comprises an indication that the display device is waiting for the signal from the external device.

10. The display device of claim 7, wherein the signal detecting unit detects a reproduction signal generated from the external device and detects a synchronous signal from the reproduction signal as the signal.

11. The display device of claim 10, wherein the reproduction signal of the external device comprises a video signal transmitted from the external signal.

12. The display device of claim 7, wherein the control unit prevents the OSD information from being displayed if the signal is detected in the signal detection operation.

13. The display device of claim 7, wherein the OSD information comprises a first indication that the signal is being detected, a second indication of no signal, and a third indication that a status of connection of the external device to at least one of a power source and the display device needs to be checked, and the control unit selectively generate the OSD information representing one of the first, second, and third indications according to the signal detected in the signal detecting unit.

14. The display device of claim 7, wherein the OSD information comprises a form of graphic.

15. A recording medium storing computer-readable codes that when executed by a computer perform a method of displaying user-guide on-screen display (OSD) information on a display device connected with the external device, the method comprising:

detecting a signal from the external device when the display device is in an external input mode; and displaying OSD information for a predetermined time to indicate a detection status of the external device if the signal is not detected from the external device in the signal detection operation, preventing the OSD information from being displayed if the signal is detected in the signal detection operation, and a need to check an operating status of the external device.

16. The recording medium of claim 15, wherein the detecting of the signal from the external device comprises detecting a synchronous signal transmitted from the external device as the signal, and the OSD information is displayed when the synchronous signal is not detected in the synchronous signal detecting operation.

17. The recording medium of claim 16, wherein the displaying of the OSD information comprises displaying first OSD information indicating that the display device is waiting for a signal of the external device if the synchronous signal is not detected.

18. The recording medium of claim 17, wherein the displaying of the OSD information comprises displaying second OSD information indicating a status of connection of the external device to a power source and to the display device needs to be checked, when the synchronous signal is not detected in the synchronous signal detecting operation within another predetermined time.

19. A method of displaying connection status information for external devices connected with a display device, the method comprising:

detecting whether the display device is in an external input mode corresponding to an external device;

detecting a synchronous signal from the external device; and displaying OSD information corresponding to one of a synchronous signal from the external device being in a process of being detected, a synchronous signal detected from the external device, and a need to check an operating status of the external device.

20. The method of claim 19, wherein the displaying of OSD information comprises:

displaying information corresponding to the synchronous signal from the external device being in the process of being detected if the synchronous signal is not detected during a first predetermined time in the detection operation; and displaying information corresponding to the need to check an operating status of the external device if the synchronous signal is not detected after the first predetermined time.

* * * * *